United States Patent
Mechtcherine et al.

(10) Patent No.: US 12,145,291 B2
(45) Date of Patent: Nov. 19, 2024

(54) METHOD AND DEVICE FOR PRODUCING A REINFORCED CONCRETE COMPONENT, AND CONCRETE COMPONENT

(71) Applicant: Technische Universität Dresden, Dresden (DE)

(72) Inventors: Viktor Mechtcherine, Dresden (DE); Albert Michel, Dresden (DE)

(73) Assignee: Technische Universität Dresden, Dresden (DE)

( * ) Notice: Subject to any disclaimer, the term of this patent is extended or adjusted under 35 U.S.C. 154(b) by 533 days.

(21) Appl. No.: 17/598,323

(22) PCT Filed: Mar. 11, 2020

(86) PCT No.: PCT/EP2020/056576
§ 371 (c)(1),
(2) Date: Sep. 27, 2021

(87) PCT Pub. No.: WO2020/193150
PCT Pub. Date: Oct. 1, 2020

(65) Prior Publication Data
US 2022/0176586 A1 Jun. 9, 2022

(30) Foreign Application Priority Data
Mar. 25, 2019 (DE) .......................... 102019107555.6

(51) Int. Cl.
*B28B 1/00* (2006.01)
*B28B 23/00* (2006.01)
(Continued)

(52) U.S. Cl.
CPC .......... *B28B 1/001* (2013.01); *B28B 23/0006* (2013.01); *E04G 21/0463* (2013.01); *B33Y 30/00* (2014.12); *B33Y 80/00* (2014.12)

(58) Field of Classification Search
CPC . B28B 1/001; B28B 23/0006; E04G 21/0463; B33Y 30/00
See application file for complete search history.

(56) References Cited

U.S. PATENT DOCUMENTS

2017/0182712 A1* 6/2017 Scribner ............... B33Y 30/00
2018/0250850 A1 9/2018 Nikita

FOREIGN PATENT DOCUMENTS

CN 106738190 A 5/2017
DE 102006018407 A1 10/2007
(Continued)

OTHER PUBLICATIONS

S. Lim, R. A. Buswell, T. T. Le, S. A. Austin, A. G. F. Gibb, and T. Thorpe, "Developments in construction-scale additive manufacturing processes," Automation in Construction, vol. 21, Jan. 2012.
(Continued)

*Primary Examiner* — Jerzi H Moreno Hernandez
(74) *Attorney, Agent, or Firm* — Michael Soderman

(57) ABSTRACT

A method and an apparatus for producing a concrete component, comprising concrete and a textile reinforcement composed of a reinforcement fiber strand (28), wherein first a yarn (20) is saturated with a mineral suspension (35) and forms the at least one reinforcement fiber strand (28). According to the invention, the reinforcement fiber strand (28) is fed by means of a moving device, so that the reinforcement fiber strand (28) is placed in a concrete strand (4), placed on a concrete layer (2), or placed on a vertical side surface of a plurality of concrete layers placed on top of each other, so that a perpendicular reinforcement is produced when arranged on the outside, and wherein the reinforcement fiber strand (28) is further enclosed by the concrete immediately upon placement or subsequently
(Continued)

before the mineral suspension (35) has cured. The invention also relates to a reinforced concrete component (1).

5 Claims, 3 Drawing Sheets

(51) Int. Cl.
    *B33Y 30/00*     (2015.01)
    *B33Y 80/00*     (2015.01)
    *E04G 21/04*     (2006.01)

(56) References Cited

FOREIGN PATENT DOCUMENTS

| | | |
|---|---|---|
| DE | 102008040919 A1 | 2/2010 |
| DE | 102015100438 B3 | 3/2016 |
| EP | 0172028 A2 | 2/1986 |
| EP | 3431172 A1 | 1/2019 |
| JP | H071429 A | 1/1995 |
| WO | 2015197910 A1 | 12/2015 |

OTHER PUBLICATIONS

B. Sevenson, "Shanghai-based WinSun 3D Prints 6-Story Apartment Building and an Incredible Home," 3DPrint.com / The Voice of 3D Printing / Additive Manufacturing, Jan. 18, 2015.

F. Bos, Z. Ahmed, E. Jutinov, and T. Salet, "Experimental Exploration of Metal Cable as Reinforcement in 3D Printed Concrete," Materials, vol. 10, No. 11, 5. 1314, Nov. 2017.

* cited by examiner

METHOD AND DEVICE FOR PRODUCING A REINFORCED CONCRETE COMPONENT, AND CONCRETE COMPONENT

CROSS REFERENCE TO RELATED APPLICATIONS

This application is the U.S. national stage of International Application No. PCT/EP2020/056576, filed on 2020 Mar. 11. The international application claims the priority of DE 102019107555.6 filed on 2019 Mar. 25; all applications are incorporated by reference herein in their entirety.

BACKGROUND

The invention relates to a method for producing a reinforced concrete component comprising a concrete matrix material and a textile reinforcement of at least one reinforcement fiber strand, wherein a yarn is saturated with a mineral suspension and is used to form the at least one reinforcement fiber strand. The invention further relates to an apparatus for producing a reinforced concrete component, the concrete component comprising a concrete matrix material and a reinforcement of at least one textile reinforcement fiber strand, wherein a reinforcement fiber strand delivery unit is provided as a device for dispensing the reinforcement fiber strand, comprising an impregnation device forming from a yarn the reinforcement fiber strand saturated with a mineral suspension.

The invention also relates to a reinforced concrete component in which a permanent formwork is filled with flowable concrete or shotcrete, and to a reinforced concrete component produced in an extrusion-based, additive manner, comprising concrete layers formed by at least one concrete strand extruded from at least one extrusion nozzle.

The present invention is preferably used in additive manufacturing. Additive manufacturing is the layer-by-layer creation of a component based on an electronic data set, also known as 3D printing. Said data set is usually derived from a three-dimensional CAD model. Unlike abrasive manufacturing methods, such as milling, additive manufacturing creates components by adding material. This makes it possible to produce components that would not be easy to produce using conventional manufacturing technologies.

Additive manufacturing may be laser-based or extrusion-based, among others. Extrusion-based methods deposit small drops or strands of material in a defined manner. In this process, translatory movement of the extrusion nozzle and/or the construction platform carrying a component builds the latter. Additive manufacturing methods are also increasingly coming into focus in concrete component manufacturing, including extrusion-based manufacturing methods. In the prior art, however, additive manufacturing with concrete either takes place entirely without reinforcement or the latter is inserted manually and discontinuously, which contradicts the principle of additive manufacturing. Further, the known techniques limit the geometry and thus the freedom of shape and also the durability and strength of the components.

Textile reinforcements and their application are known from the prior art. The production of a reinforced concrete component with at least one fiber strand composed of a multifilament yarn saturated with a mineral suspension is known from DE 10 2015 100 438 B3. Said document, in particular claims 1 to 4, paras [0035], [0058], [0064] and [0099], as well as FIGS. 2, 3, 10 and 11, discloses a reinforced concrete component, referred to as "prefabricated textile concrete component" with at least one fiber strand as textile reinforcement strand (concrete roving 20, claims 1 to 3, FIG. 10), in which a multifilament yarn (high-performance filament yarn 7; claim 2) is saturated with a suspension ("wetted with fine concrete 21"-claim 3) and the saturated multifilament yarn 7 is used to form at least one fiber strand 20 (claim 3) fed by means of a moving device (laying robot 19; para. [0099]) for dispensing the at least one fiber strand 20 (yarn dispensing device 18; claim 4, FIG. 3) (claim 1, para. [0058]). However, a fixed mold is required on which the fiber strand can be deflected and fixed in order to still remain in the intended position without damage during subsequent concreting. Only concrete components in a fixed, specified shape can be produced. Furthermore, according to paragraph [0064], the mineral suspension is first cured before the reinforcement is placed in the formwork together with the concrete.

In a method for producing a concrete component with a textile reinforcement disclosed in DE 10 2008 040 919 A1, a textile fiber material is saturated with a curable polymer. The textile fiber material saturated with the polymer is embedded in the concrete component while it is still uncured, so that the polymer is mixed with the concrete in a bonding zone. A concrete component has a textile reinforcement which is a textile fiber material saturated with a curable polymer. The concrete component has a bonding zone in which the polymer is mixed with the concrete. The use of a polymer, i.e. a different material compared to concrete, has disadvantages. These consist, for example, in the lower load-bearing capacity and strength when exposed to heat.

EP 3 431 172 A1, in particular claims 1 and 16 as well as paragraphs [0039], [0073], [0093] to [0099], discloses a method for extrusion-based additive manufacturing of a reinforced concrete component ("concrete-based components; claim 16) comprising concrete layers (FIG. 16) formed by at least one concrete strand (concrete strand, layer 15 [para. 0073]) extruded from an extrusion nozzle (nozzle 21; claim 1) moved relative to the concrete component by means of a manipulation device (robot 32; FIG. 20) for each concrete layer 15 in the plane of the concrete layer 15, wherein at least one fiber strand ("reinforcing element 30 in continuous strand"; para. [0097], "fibrous base material such as carbon, . . . in the form of . . . filaments"; paragraphs [0039], [0097]) is used, wherein the at least one fiber strand 30 is fed into one of the concrete layers 15 (FIG. 16). The fiber strand 30 is fed to the concrete layer 15 by means of a moving device for dispensing the at least one fiber strand 30 ("introduced . . . during the application process in an automated manner . . . via a mechanism of the nozzle . . . "; para. [0097]). However, the proposed method does not allow embedding a fiber strand freshly treated with a mineral suspension in the concrete matrix material.

DE 10 2006 018 407 A1 describes rovings with filaments surrounded by fine concrete, including individual filaments, and their "fresh-on-fresh" deposition in more than two layers (FIG. 1) in a wax plate. In this process, a filament saturated with a mineral suspension is placed between two concrete layers and surrounded by them. The resulting concrete component is a reinforcement structure made of reinforced concrete. The wax plate only allows a fixed predefined structure of the reinforcement and is also costly to manufacture.

Additive manufacturing methods based on extrusion and strip deposition of concrete are known from non-patent literature and other media, respectively. By way of example, two publications on the Internet were available on the filing date at https://www.detail.de/artikel/beton-3d-druck-aufder-baustelle-29487/and https://www.3d-grenzenlos.de/magazin/zukunft-visionen/us-army-patent-beton-kaserne-aus-3d-drucker-27409553/.

In additive manufacturing processes based on extrusion, there are currently four variants of reinforcement integration for the production of wall-like concrete components. A first method was published in S. Um, R. A. Buswell, T. T. Le, S. A. Austin, A. G. F. Gibb, and T. Thorpe, "*Developments in construction-scale additive manufacturing processes,*" *Automation in Construction*, vol. 21, January 2012, and under the title "3D Printed Castle" (author: Andrey Rudenko) at http://totalkustom.com/photo.html (accessed Feb. 25, 2020). This method includes manually placing the reinforcement along the component axis, as a longitudinal reinforcement, including welded transverse reinforcement, on individual printed concrete strands (cf. FIG. 1 in said document). The reinforcement perpendicular to the printing plane (generally the vertical reinforcement) is subsequently positioned in cavities left free for this purpose (cf. FIG. 1 in said document), which are then filled with concrete. The reinforcement introduced in this manner can be installed stress-free or prestressed.

The problems resulting from manual, discontinuous placement of the reinforcement are particularly severe here, since this process has to be repeated continually. The subsequent insertion of the perpendicular reinforcement also restricts the component geometry. Another problem is the durability of the placed reinforcement structures, as reinforcements placed in this way often have insufficient concrete cover and are thus susceptible to corrosion and elevated temperatures. The corrosion problem is also exacerbated by the fact that the construction joints between individual concrete layers have a lower resistance to liquids and gases compared to the concrete.

According to a second well-known method published in B. Sevenson, "*Shanghai-based WinSun 3D Prints 6-Story Apartment Building and an Incredible Home,*" 3DPrint.com/The Voice of *3D Printing/Additive Manufacturing*, 18 Jan. 2015, a reinforcement cage is introduced after the production of an integrated formwork (contour crafting process) (cf. FIG. 2 in said document). For this purpose, only the contour must be printed in advance, without any wavy or zigzag bracing inside the wall (cf. FIG. 1 in the document).

The method severely restricts the freedom of shape of the concrete components to be manufactured. The subsequent implementation of the reinforcement precludes tapering, curvature or twisting of the component geometry in many cases.

In a third known method, a flexible, braided or twisted wire strand bundle, similar to a Bowden cable, is unwound from a spool with the aid of a mechanical drive, inserted into an opening at the extrusion nozzle for concrete printing, and thus continuously incorporated into a concrete strand during extrusion. This method was published in F. Bos, Z. Ahmed, E. Jutinov, and T. Salet, "*Experimental Exploration of Metal Cable as Reinforcement in 3D Printed Concrete,*" *Materials*, vol. 10, no. 11, 5. 1314 November 2017, and in J. H. Lim, B. Panda, and Q.-C. Pham, "*Improving flexural characteristics of 3D printed geopolymer composites with in-process steel cable reinforcement,*" *Construction and Building Materials*, vol. 178, 5. 32-41, July 2018.

The method does allow the placement of a reinforcement, but only in the direction of the concrete strands (usually horizontally). The implementation of the vertical reinforcement must still be carried out separately. Since the deflection radii are limited by the bending stiffness of the wire, the variety of shapes and freedom of reinforcement layout is restricted in this method as well. For example, the implementation of corners is not possible. As with the first method, the reinforcement is not protected against corrosion in the case of thin concrete covers. In addition, the extremely smooth steel wires have insufficient bonding properties with the concrete, which is why, depending on the wire diameter, bond lengths of up to 180 mm are necessary.

A fourth method, published in "*HuaShang Tengda-Hausbau mit dem Drucker (Herstellervideo)—Video.Golem.de*", *Golem.de*. [*Online*]. Available at: https://video.golem.de/wissenschaft/17348/huashang-tengda-hausbau-mit-dem-drucker-herstellervideo.html (accessed on Feb. 25, 2020), uses a forked print head. The forked print head encloses the reinforcement, which has already been inserted and mounted in a secure position, and applies concrete to both sides of the reinforcement.

When using this method, the height of the reinforcement is limited to the length of the forked print head. Only relatively simple vertical elements with a cross-section that is invariable over the height and length can be produced. The reinforcement elements as such must also be configured simple and uniform, since otherwise the enclosure of the reinforcement by concrete cannot be executed in sufficient quality.

In known prior art apparatuses, extruded concrete is usually applied in layers by means of an application head comprising an extrusion nozzle. A problem here is the dynamic introduction of a reinforcement to improve the component properties. Although an apparatus is known that allows dynamic introduction of a steel wire, the use of wire-shaped steel reinforcements has disadvantages in practice. For example, steel reinforcements have low flexibility, which is particularly disadvantageous for complex component structures. Other disadvantages are poor adhesion of steel wires in the concrete structure and susceptibility to corrosion in areas where the reinforcement is not sufficiently covered by concrete. Even replacing steel wires with plastic wires that have no tendency to corrode would result in inadequate bonding to the surrounding matrix, apart from the lack of strength. Method features from the known solutions could not be applied for suitable reinforcement either, since, for example, the aforementioned stiff plastic wires have low process engineering requirements for feeding.

SUMMARY

In view of the aforementioned disadvantages of the prior art, it is the object of the present invention to provide a method for in-line implementation of a temperature and corrosion resistant high-performance reinforcement for extrusion-based additive manufacturing methods and the manufacturing method as well as the product. The method should also be suitable for integrating all three required reinforcement directions, i.e. perpendicular reinforcement parallel to the vertical surface, horizontal reinforcement and shear reinforcement each parallel to the horizontal surface, in particular for wall-type concrete components, and also provide a method sequence that may be configured continuously, discontinuously or in the desired graduation.

The object is achieved by a method for producing a concrete component comprising a concrete matrix material and a textile reinforcement composed of at least one reinforcement fiber strand. To form the reinforcement fiber strand, a yarn is first saturated with a mineral suspension.

The yarn prepared in this manner, in particular a multifilament yarn, then forms the at least one reinforcement fiber strand.

DETAILED DESCRIPTION

According to the invention, the at least one reinforcement fiber strand is dispensed in such a manner, preferably by means of a moving device for dispensing the at least one reinforcement fiber strand, particularly preferably in a stress-free manner, that the at least one reinforcement fiber strand is,
- according to a first embodiment, placed in at least one concrete strand or,
- according to a second embodiment, placed on at least one concrete layer.

According to a further embodiment, the reinforcement fiber strand may be applied to at least one vertical side surface of a plurality of superimposed concrete layers of the concrete component, so that a perpendicular reinforcement or reinforced concrete layer is created which is arranged on the outside of the concrete component. According to one of the above embodiments, this is done into the concrete strand or onto the concrete layer.

Further, the at least one reinforcement fiber strand is enclosed by the concrete immediately upon deposition or subsequently before the mineral suspension has cured. This represents a particular advantage of the invention.

For enclosing, a particularly suitable solution is to deposit the material through an extrusion nozzle, which dispenses the concrete. Alternatively, the extrusion nozzle may be replaced by a spray nozzle, for example. However, it is also possible to apply another layer of concrete to embed the reinforcement fiber strand in concrete.

When filling larger volumes, a defined contour is not required. With such components, it is unfavorable to line up concrete strand to concrete strand, as these would only have a poor bond with each other. Such components should be cast if possible. However, the concreting and the implementation of the reinforcement may also be combined here by the method according to the invention and its embodiments according to the dependent claims. In particular, concrete strands may be used to form a permanent formwork, which may then be cast with concrete.

The concrete component produced by means of a permanent formwork, which is preferably produced using flowable concrete for casting or, in the case of inclined surfaces, shotcrete, may be produced in such a manner that the entire formwork is filled at once. In this case, only the outer shell, i.e. the permanent formwork, is reinforced. However, according to an alternative embodiment, concrete layers may be formed. A reinforcement fiber strand can then be applied to each of these in the manner described above. Then the entire volume of the concrete component receives a reinforcement which is preferably adapted to the load.

A further, particularly advantageous embodiment of the method according to the invention relates to a method for the extrusion-based additive production of a reinforced concrete component, comprising in particular horizontal concrete layers formed by at least one concrete strand extruded from an extrusion nozzle moved by means of a manipulation device for each concrete layer in the, in particular horizontal, plane of the concrete layer relative to the concrete component being produced or to the substrate or the previously produced concrete layer. This applies accordingly to other planes, for example the vertical plane of the side walls.

According to the invention, the reinforcement is a yarn, preferably a multifilament yarn, which, when saturated with a mineral suspension, forms a reinforcement fiber strand. The reinforcement fiber strand is fed to the concrete component to be produced by means of a reinforcement fiber strand delivery unit, i.e. a device for dispensing the reinforcement fiber strand, moved by a manipulation device.

The reinforcement material to be used is the reinforcement fiber strand comprising the yarn, preferably a multifilament yarn, saturated or impregnated with a mineral suspension, in particular a particle suspension, e.g. based on ultrafine cement, geopolymer, alkali-activated binder or pozzolanic fines. Preferred materials for the multifilament yarn are carbon, but also glass, basalt or polymer. In the freshly saturated state, the reinforcement fiber strand is formable even with low force application and can be continuously introduced directly (in-line) into the concrete structure in the progressing 3D printing process using extruded concrete, thereby forming concrete strands.

The concrete strands as well as the mineral saturated carbon yarns are deposited using a manipulation device, for example an articulated robot or a gantry robot. It is further envisaged that the reinforcement fiber strand is placed in the concrete component to be produced and that the reinforcement fiber strand is directly, immediately or subsequently enclosed by concrete before the mineral suspension has cured.

At the beginning of a preferred embodiment of the process according to the invention, the yarn, in particular a carbon yarn as preferred multifilament yarn, is saturated or impregnated with a suitable suspension. Impregnation is a soaking treatment of solid porous materials. Basic conditions for successful impregnation of multifilament yarns with mineral suspensions are the following steps:

1. Preparation of a suitable saturation matrix: To ensure penetration with the saturation matrix, it must be sufficiently flowable and carry particles fine enough to slide through between the filaments. This requirement thus presupposes the use of ultra-fine cements (dgs <20 µm) and very fine additives, such as microsilica. The addition of microsilica promotes the formation of reaction products on the surface of the carbon yarns. However, the use of more than 20% microsilica, based on the total binder mass, is not recommended, since the water requirement of the suspension is increased and, at the same time, the strength of the cured matrix is reduced.

In terms of consistency, a yield point below 80 Pa and a plastic viscosity below 1.5 Pa*s are required. Reducing these parameters by increasing the addition of water and superplasticizer results in improved impregnation. The compromise between flowability of the suspension and strength of the cured binder matrix must of course also be taken into account.

2. Pretreatment of the yarn, guidance to the saturation bath: It is necessary to impregnate the yarn in the most spread condition possible. It is therefore advisable to use multifilament yarns which are rolled up as "flat tow", as these are supplied by the manufacturer already in a spread state, in contrast to the "narrow tow". Before and during saturation, twisting the yarn must be avoided, as at this point the spread condition is cancelled. The yarn may also be additionally spread, if necessary, by guiding it over e.g. convex elements before immersion in the saturation bath.

Prewetting of the yarn with water has proven to be beneficial for soaking as well as
- for process stability and can be integrated into the impregnation system, as by a kiss coater, if required.

3. Implementation of a suitable saturation method: Generally, the prior art methods known in the textile sector, i.e. using a padder or a two-roll or nip padder, are suitable for saturating the multifilament yarn. In the case of the padder, the multifilament yarn is fed into the suspension, which is in a saturation bath.

It has been shown that multiple deflection of the multifilament yarn is necessary for complete soaking. A single deflection, on the other hand, is not effective. Rolls or fixed elements may be used for deflection. Convex shaped deflection elements additionally spread the carbon yarn and improve the soaking.

The two-roll or nip padder is an open system. The suspension is not in a saturation bath, but is filled into the nip between two rolls, through which the multifilament yarn is passed. Again, instead of the rolls, fixed elements may be used via which the multifilament yarn is guided. If required, multiple yarns may also be passed through the saturation point side by side and then bundled.

4. Squeezing off excess suspension and shaping the yarn: The squeezing off of excess suspension and the shaping of the saturated multifilament yarn, i.e. the reinforcement fiber strand, should take place in one work step, as this achieves a very uniform distribution of (carbon) filaments and mineral suspension. For the process, strand nozzles whose diameters can be expanded or which can be opened have proven to be useful. By narrowing the cross-section, high fiber volume contents can be achieved.

If stalling occurs during squeezing, for example due to agglomerates in the cement suspension, it is possible to expand the diameter briefly or open the strand nozzle to ensure continuity of the process. It should be noted that high fiber volume contents make it much easier to deposit the saturated yarns, since less suspension can escape from the yarn.

Both a padder and a two-roll padder are suitable for the present application. There are three possibilities for feeding the impregnated yarn to the manipulation device, which also affect the design of the impregnation process.

According to a first embodiment, the reinforcement fiber strand is formed in a stationary manner in a strand preparation device comprising at least one impregnation device and is fed to the reinforcement fiber strand delivery unit for dispensing to the concrete component to be produced. This variant is also referred to as stationary-direct, because the reinforcement fiber strand is impregnated or saturated with the aid of a stationary strand preparation device and routed directly to the reinforcement fiber strand delivery unit attached to the manipulation device via a strand transferring means that can be formed by deflection points.

The impregnation or saturation process is preferably carried out by means of a three- or five-roll padder. The number and shape of the deflection rolls (e.g. convex for improved yarn spreading) in the suspension bath of the mineral suspension can be varied. Also provided is a kiss coater, which is used to wet the yarn with a small amount of water prior to the impregnation or saturation process. Yarn guiding devices may be used to center the yarn. The squeezing off of excess matrix material, the mineral suspension, as well as the shaping of the cross-section of the reinforcement fiber strand, or reinforcement cross-section, is carried out with the aid of a strand nozzle that is conical or funnel-shaped in the direction of the strand and whose outlet diameter is either constant or variable.

After shaping, the yarn is conveyed to the reinforcement fiber strand delivery unit via a deflection roll. In the alternative embodiment, the yarn is fed directly into the extrusion nozzle for concrete printing.

In a second embodiment of the process according to the invention, the reinforcement fiber strand is formed in a stationary manner in a strand preparation device and wound into a strand coil. The strand preparation device comprises at least one impregnation device, which may also be configured as an impregnation bath. This variant is also called stationary-indirect. This process is identical to the first embodiment, which was referred to as the stationary-direct impregnation or saturation process, up to the forming stage. After shaping, however, the reinforcement fiber strand is rolled onto the further coil, or strand coil, in the sense of a semi-finished product.

After the strand coil has been fully loaded, it is removed from the impregnation system and installed in the reinforcement fiber strand delivery unit at the manipulation device, where the reinforcement fiber strand is unwound from the strand coil and installed in the extrusion-based additive manufacturing process, also known as concrete printing process. It should be noted that the time window from the start of the impregnation process to the complete installation of the reinforcement fiber strand is limited due to the progressive chemical reactions in the suspension. However, provided that the yarn can be prevented from drying out or curing, a processing time window of several hours is possible.

According to a third embodiment, the reinforcement fiber strand is formed directly in the reinforcement fiber strand delivery unit as it moves over the concrete component surface during the extrusion-based additive process. For this purpose, the reinforcement fiber strand delivery unit comprises a strand preparation device which includes at least one impregnation device. This embodiment is also referred to as instationary-direct. According to another alternative, the reinforcement fiber strand is impregnated or saturated with the aid of an apparatus that is attached directly to the manipulator and for this reason must be as compactly dimensioned as possible.

In all of the foregoing embodiments of the invention, the reinforcement fiber strand is formed by saturation with a mineral suspension. The impregnation or saturation process is preferably carried out with a padder, in particular a two-roll padder or a three-roll padder. The number and shape of the deflection rolls in the suspension bath, e.g. a convex shape for improved yarn spreading, can be varied. Yarn guiding devices may be used to center the yarn. The excess matrix is squeezed off and the reinforcement cross-section is shaped with the aid of a strand nozzle which is conical or funnel-shaped in the direction of travel of the multifilament yarn or the reinforcement fiber strand and whose outlet diameter is either constant or, particularly advantageously, variable.

In a preferred embodiment of the method according to the invention, a kiss coater is provided, which is used to wet the multifilament yarn with water prior to the impregnation or saturation process, a small amount of water being sufficient. Other suitable methods for wetting or prewetting are also envisaged.

A particularly preferred impregnation system for carrying out the method according to the invention also has a yarn brake from which the multifilament yarn is unwound, three yarn guide planes via which the multifilament yarn is straightened, a total of four fixed deflectors for yarn spreading, a three-roll padder-type impregnation means and a strand nozzle, also known as shaping nozzle.

Regardless of the type of impregnation or saturation and the positioning of the corresponding apparatus, the impregnated or saturated multifilament yarn must be mechanically conveyed to the installation site as a reinforcement fiber strand. This task is solved with the aid of a reinforcement fiber strand delivery unit. The reinforcement fiber strand delivery unit may be configured to allow direct integration of the reinforcement fiber strand into a concrete strand or integration between two concrete strands. The reinforcement fiber strand is thereby fed into or onto at least one of the concrete layers.

The reinforcement fiber strand is fed into at least one of the concrete layers or into the concrete strand initially present, which is also referred to as direct integration. This is achieved by an immobile arrangement of the reinforcement fiber strand delivery unit with respect to the extrusion nozzle, i.e. the two are connected to each other. The reinforcement fiber strand delivery unit and the extrusion nozzle are movable for each concrete layer in the, in particular horizontal, plane of the concrete layer relative to the concrete component or the substrate or the previously produced concrete layer. The reinforcement fiber strand is dispensed in the extrusion direction of the extrusion nozzle and embedded in the exiting concrete strand. This is achieved, for example, by the reinforcement fiber strand entering the extrusion nozzle from the side facing away from a dispensing opening.

As an alternative to the previously described embodiment, there is another possibility for direct integration of the reinforcement fiber strand between the partial strands of a split concrete strand. This is done by dividing the concrete to be extruded into two partial strands and reuniting them directly behind the opening through which the reinforcement is introduced in the form of the reinforcement fiber strand, so that the reinforcement is enclosed by the concrete. The partial strands are dispensed from two separate extrusion nozzles arranged side by side. In the case of direct integration, in both variants the reinforcement fiber strand delivery unit must not be displaced or rotated relative to the extrusion nozzle.

In direct integration, according to a preferred embodiment, the reinforcement fiber strand, for example a (carbon) yarn impregnated with cement, is first fed into an inlet device, for example designed as a funnel, and conveyed by a first pair of drums. A second pair of drums deflects the yarn in the intended direction, e.g. horizontal. It is then fed into a stripping device and through a guillotine-type cutting device. The latter allows to interrupt the conveying of the reinforcement fiber strand and the addition of a reinforcement to the concrete strand at any time by cutting the yarn.

Via a further guiding device, which is preferably configured as a hose in the case of horizontal conveying, the reinforcement fiber strand is fed directly into the extrusion nozzle provided for concrete printing. At this point, the reinforcement fiber strand is integrated into the concrete strand, which is placed on a previously produced concrete strand, i.e. the bottom concrete layer. To prevent the extruded concrete from backing up into the hose, a closing apparatus may be installed at the end of the hose. Said apparatus may be closed during concrete extrusion without reinforcement integration and must be opened during reinforcement integration to allow the reinforcement fiber strand to pass through.

As an alternative to direct integration of the reinforcement fiber strand, a method for depositing the reinforcement fiber strand alone is provided. In this method, the reinforcement fiber strand is fed onto at least one of the concrete layers. For this purpose, the reinforcement fiber strand delivery unit can be moved for each concrete layer in the, in particular horizontal, plane of the concrete layer relative to the concrete component being produced or to the substrate or the previously produced concrete layer. The reinforcement fiber strand is dispensed, preferably in a direction vertically downward onto the concrete layer, and is covered by the subsequent concrete strand. If the reinforcement fiber strand is dispensed vertically downward, it can be guided in any direction without having to turn the reinforcement fiber strand delivery unit in that direction.

When integrating the reinforcement fiber strand between two concrete layers, the reinforcement fiber strand thus preferably exits the reinforcement fiber strand delivery unit vertically downward and can also be laid regardless of the orientation of the concrete strand. For this type of yarn conveyance, the second pair of drums in the reinforcement fiber strand delivery unit is arranged horizontally. The reinforcement fiber strand is positioned with the aid of a rotationally symmetrical, elliptical or oval extrusion nozzle, which is funnel-shaped on both sides. While direct integration allows deposition of the concrete strand without reinforcement but not deposition of the reinforcement fiber strand without the concrete strand, the latter approach is possible in this variant. The production of a reinforcement structure entirely without extruded concrete can thus also be realized.

In the case of integration of the reinforcement fiber strand between two concrete strands, also referred to as concrete filaments, or between two concrete layers, a flowable cement suspension or mortar may be introduced into the interlayer or between the concrete layers for improved adhesion between the reinforcement fiber strand and the concrete layer of extruded concrete. Since the concrete for extrusion must have a very stiff consistency, there is a risk that the yarn will not be sufficiently enclosed by the concrete, and that a separation layer will form instead.

In both types of deposition or integration, the reinforcement fiber strand, preferably the pretreated (carbon) yarn, is inserted into the conveyor once at the beginning of the process. In the further course, the yarn conveyance can be stopped whenever desired, the reinforcement fiber strand can be cut with the aid of the cutting device, and the conveyance of the reinforcement fiber strand can be resumed if required.

If the degree of reinforcement in the concrete is to be varied, it is possible to double multiple yarns, i.e., in contrast to twisting, to combine several yarns without twisting, or to arrange several yarns side by side, which leads to a comparable result. Alternatively, the height and, if necessary, also the width of the concrete strands may be changed.

The implementation of the horizontal reinforcement layers can be coupled accordingly with the respective concrete layers. The longitudinal reinforcement is placed accordingly with the concrete strands in the longitudinal direction of the concrete component, while the shear reinforcement is placed by forming zigzag-shaped bracings. When depositing the yarn, the reinforcement fiber strand can advantageously be routed beyond the zigzag extruded concrete strand and only deposited on the concrete strand in the longitudinal direction after overlapping with its reinforcement. This provides the possibility of a force-locking connection between the area-forming longitudinal filaments and the shear-force-bearing bracing.

As construction progresses, the aforementioned processes run alternately. It is also provided that the reinforcement fiber strand is dispensed onto vertical surfaces of the concrete component from the outside, so that a perpendicular reinforcement is produced, preferably including a covering concrete strand, particularly preferably on both sides of the concrete component to be produced. For this purpose, an articulated robot with three-dimensional mobility may be used as a manipulation device. The reinforcement of the vertical surfaces is carried out after completion of the concrete component or a component section, when the vertical reinforcement including covering concrete strands can be printed onto the contour from the outside on both sides. As mentioned, the reinforcement fiber strand may also be covered by or integrated into a concrete strand.

The method according to the invention can be used to produce wall-like elements as well as other components. Generally, it is possible to manufacture a component entirely additively (e.g. extrusion-based) or to produce only the contour. The area or space within the contour can then be provided with reinforcement, for example with the aid of the "indirect method" described above, i.e. concreting in particular in layers after the reinforcement fiber strand has been applied to the previous concrete layer. Alternatively, prior art reinforcement may be used. This approach may be used for flat or curved surfaces, among others.

Beam-type components can be manufactured in a similar way to wall-type components, with the difference that more longitudinal reinforcement is required in the tension zone. For this purpose, multiple reinforced concrete filaments, i.e. the fiber strands according to the invention, may be laid next to and/or on top of each other.

Another aspect of the present invention relates to an apparatus for producing a reinforced concrete component. The concrete component comprises a concrete matrix material and a reinforcement of at least one textile reinforcement fiber strand. An impregnation device is provided which forms the reinforcement fiber strand impregnated with a mineral suspension from a yarn. According to the invention, an apparatus is provided for producing and depositing, preferably without tension, the textile reinforcement fiber strand.

Furthermore, a reinforcement fiber strand delivery unit, i.e. a device for dispensing the reinforcement fiber strand, is provided, which is movable relative to the concrete component or to the substrate or the previously produced concrete layer and is suitable for placing the reinforcement fiber strand
- in a concrete strand, according to a first embodiment,
- on a concrete layer, according to a second embodiment, or
- on a vertical side surface of a plurality of superimposed concrete layers of the concrete component or in the concrete strand applied there, according to a third embodiment.

In all embodiments, it is ensured that the reinforcement fiber strand is enclosed by concrete immediately or subsequently before the mineral suspension has cured.

According to an advantageous embodiment, the apparatus is provided for the extrusion-based additive production of a reinforced concrete component comprising in particular horizontal concrete layers formed by at least one concrete strand. The concrete strand is extruded from an extrusion nozzle, which is moved by means of a manipulation device for each concrete layer in the, in particular horizontal, plane of the concrete layer relative to the concrete component being produced or to the substrate or the previously produced concrete layer. The apparatus comprises the manipulation device and the extrusion nozzle.

According to the invention, an impregnation device is provided which is suitable for saturating a yarn intended as reinforcement, preferably a multifilament yarn, with a mineral suspension and thus forming a reinforcement fiber strand which can be used as reinforcement. Furthermore, a movable reinforcement fiber strand delivery unit is provided which is suitable for feeding the reinforcement fiber strand to the concrete component to be produced by means of movement by a manipulation device, preferably in a tension-free manner, in such a way that the reinforcement fiber strand is inserted into the concrete component to be produced and the reinforcement fiber strand is enclosed with concrete directly, immediately afterwards or alternatively at a later point, before the mineral suspension has cured.

Advantageous embodiments of the manipulation device include an articulated robot with three-dimensional mobility or a gantry robot with at least two-dimensional mobility. For the use of the gantry robot, at least the mobility of the extrusion nozzle in the plane must be ensured for vertically movable concrete components, e.g. via a lifting table.

The impregnation device preferably comprises a yarn coil accommodating a multifilament yarn, a padder, in particular a three-roll padder, or a two-roll padder. A strand nozzle for squeezing off excess suspension from the reinforcement fiber strand and for shaping the reinforcement cross-section, i.e. the cross-section of the reinforcement fiber strand, which is conical or funnel-shaped in the direction of travel of the reinforcement fiber strand and has a constant or variable outlet diameter, has proven to be advantageous with regard to the device for pretreating the multifilament yarn.

In its preferred embodiment, the impregnation device further comprises a kiss coater suitable for wetting the multifilament yarn with a small amount of water prior to the impregnation or saturation process.

According to a first embodiment, the impregnation device is of stationary configuration and comprises a device for supplying the reinforcement fiber strand to the reinforcement fiber strand delivery unit or, according to a second embodiment, a device for storing the reinforcement fiber strand on a strand coil provided for supply to the reinforcement fiber strand delivery unit. According to a third embodiment, the impregnation device is connected to the reinforcement fiber strand delivery unit, so that the direct supply of the reinforcement fiber strand to the reinforcement fiber strand delivery unit can take place as required, even during its movement.

For direct integration of the reinforcement fiber strand into the concrete, the reinforcement fiber strand delivery unit includes a funnel and a first pair of drums which convey the reinforcement fiber strand. A second pair of drums is provided to deflect the reinforcement fiber strand into the required orientation, such as horizontal. Furthermore, a stripping device as well as a guillotine-type cutting device are provided, through which the reinforcement fiber strand is subsequently conveyed, a further guiding device being provided for this purpose, which is preferably configured as a hose in the case of horizontal conveyance. With the aid of the further guiding device, the reinforcement fiber strand is introduced directly into the extrusion nozzle in the extrusion direction, so that the reinforcement fiber strand is integrated into the concrete strand.

Furthermore, a closing apparatus that can be closed during concrete extrusion without reinforcement integration, i.e. without integration of the reinforcement fiber strand into the concrete strand, and opened during reinforcement integration, i.e. during integration of the reinforcement fiber strand into the concrete strand, has proven to be advantageous. The closing apparatus helps to prevent the extruded concrete from backing up into the further guiding device.

Alternatively, the extrusion nozzle is configured such that the concrete to be extruded is divided into two partial strands and converges directly behind an opening through which the reinforcement fiber strand is introduced, so that the reinforcement fiber strand is immediately enclosed by the concrete without having to carry out any elaborate sealing.

To place the reinforcement fiber strand between two concrete layers, a reinforcement fiber strand delivery unit is provided which dispenses the strand vertically downward. Its function has already been described with the operating method above.

Another aspect of the present invention relates to a reinforced concrete component produced in an extrusion-based, additive manner, comprising in particular horizontal concrete layers formed by at least one concrete strand extruded from an extrusion nozzle. According to the present invention, the reinforcement provided is a yarn and, in particular, a multifilament yarn which, for installation in the concrete strand or between two concrete strands, is saturated with a mineral suspension to form a reinforcement fiber strand which is completely enclosed with concrete in the concrete component, the installation and the enclosure having taken place before the mineral suspension has cured.

Advantageously, the concrete component can be obtained by a method as described above.

The invention advantageously enables in-line implementation of a durable high-performance reinforcement in additive manufacturing with concrete, also known as concrete 3D printing. With the aid of the invention, the fully automated and fully digitized production of concrete components can be realized. This represents a significant step forward in establishing the 3D concrete printing process in the concept of digital construction. The invention also enables the production of curved or tapered, non-corroding and high-temperature-resistant concrete components.

In the production of mineral-saturated (carbon) fiber reinforcements according to the prior art, the problem exists that these extremely thin structures dry out very quickly and thus the curing of the binder is not optimal. Since the method described provides for direct, immediately subsequent or, alternatively, short-term subsequent enclosure of the reinforcement fiber strand with concrete ("fresh in fresh"), this constitutes an ideal concrete curing process that overcomes the existing disadvantages of the known solutions.

The invention is explained in more detail below by way of a description of exemplary embodiments and their illustration in the corresponding drawings. In the drawings:

DETAILED DESCRIPTION OF THE PREFERRED EMBODIMENTS

Figure 1:
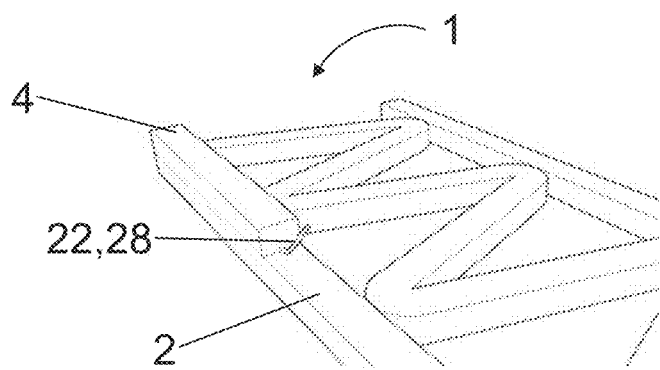
FIG. 1: is a schematic representation of an embodiment of a concrete component according to the invention with introduced longitudinal reinforcement.

FIG. 1 shows a schematic representation of an embodiment of a concrete component 1 according to the invention with introduced longitudinal reinforcement 22, configured as a reinforcement fiber strand 28. The reinforcement fiber strand 28 is embedded in a concrete strand 4. The concrete strand 4 is placed on the concrete layer 2 formed by a previously produced concrete strand 4, resulting in the additive, layer-by-layer production of the concrete component 1.

Figure 2:
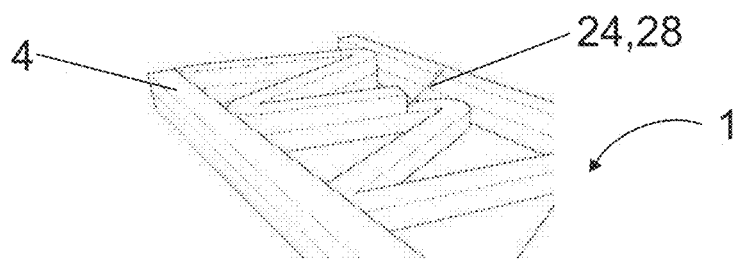
FIG. 2: is a schematic representation of an embodiment of a concrete component according to the invention with introduced transverse reinforcement.

FIG. 2 shows a schematic representation of an embodiment of a concrete component 1 according to the invention with introduced transverse reinforcement 24, consisting of a reinforcement fiber strand 28. The transverse reinforcement 24 provides strength to the transverse struts laid out in a zigzag pattern inside the concrete component 1. Again, the reinforcement fiber strand 28 is embedded in the concrete strand 4.

Figure 3:
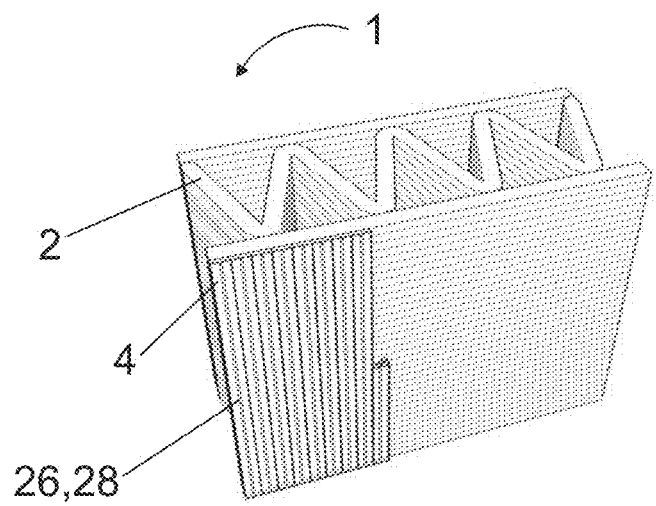
FIG. 3: is a schematic representation of an embodiment of a concrete component according to the invention with introduced perpendicular reinforcement.

FIG. 3 shows a schematic representation of an embodiment of a concrete component 1 according to the invention with introduced perpendicular reinforcement 26 by means of a reinforcement fiber strand 28. Once the production of the concrete component 1 or a section thereof as shown in FIGS. 1 and 2 is complete, the perpendicular reinforcement 26 is applied to the outer wall to provide the flexural load-bearing capacity in the horizontal loading direction. In the preferred embodiment, as shown, reinforcement 26 is also embedded in a concrete strand 4. This ensures optimum bonding to the concrete matrix and also protects the reinforcement fiber strand 28 from damage.

Figure 4:
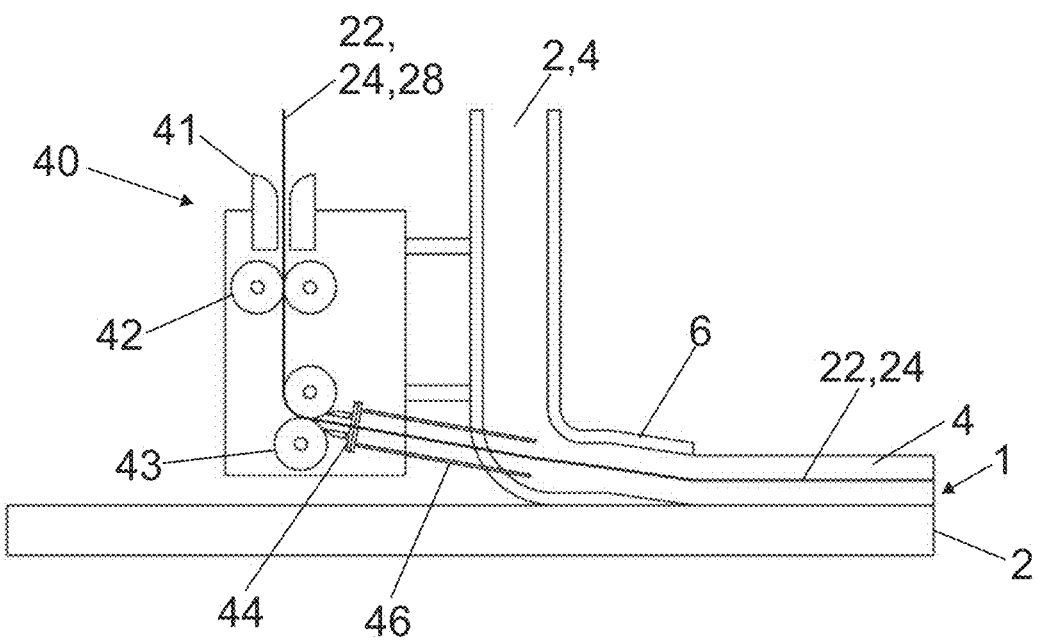
FIG. 4: is a schematic representation of an embodiment of an apparatus according to the invention for direct integration of a reinforcement fiber strand.

FIG. 4 shows a schematic representation of an embodiment of a reinforcement fiber strand delivery unit 40 according to the invention for direct integration of the reinforcement fiber strand 28 into the concrete strand 4. The reinforcement fiber strand delivery unit 40 for direct integration of the reinforcement fiber strand 28 is fixedly connected to the extrusion nozzle 6, since the dispensing direction of the reinforcement fiber strand 28 is fixed to the working direction of the extrusion nozzle 6. The reinforcement fiber strand 28 is fed to the reinforcement fiber strand delivery unit 40 for use as longitudinal reinforcement 22, transverse reinforcement 24, or perpendicular reinforcement 26, and enters the reinforcement fiber strand delivery unit 40 via the inlet device 41. First, the reinforcement fiber strand 28 is gripped by a first pair of drums 42. A second pair of drums 43 handles the deflection of the reinforcement fiber strand 28 in the working direction. The second pair of drums 43 is followed by a guillotine-type cutting device 44, which in turn is followed by a further guiding device, which is configured as a hose 46. Advantageously, the hose 46 has a closable opening that can be closed when no reinforcement fiber strand 28 is exiting and concrete ingress is to be prevented. The hose 46 opens into the extrusion nozzle 6, so that the reinforcement fiber strand 28 can be embedded directly in the concrete flowing through the extrusion nozzle 6 and exits the extrusion nozzle 6 together with it as an already "reinforced" concrete strand 4.

Figure 5:
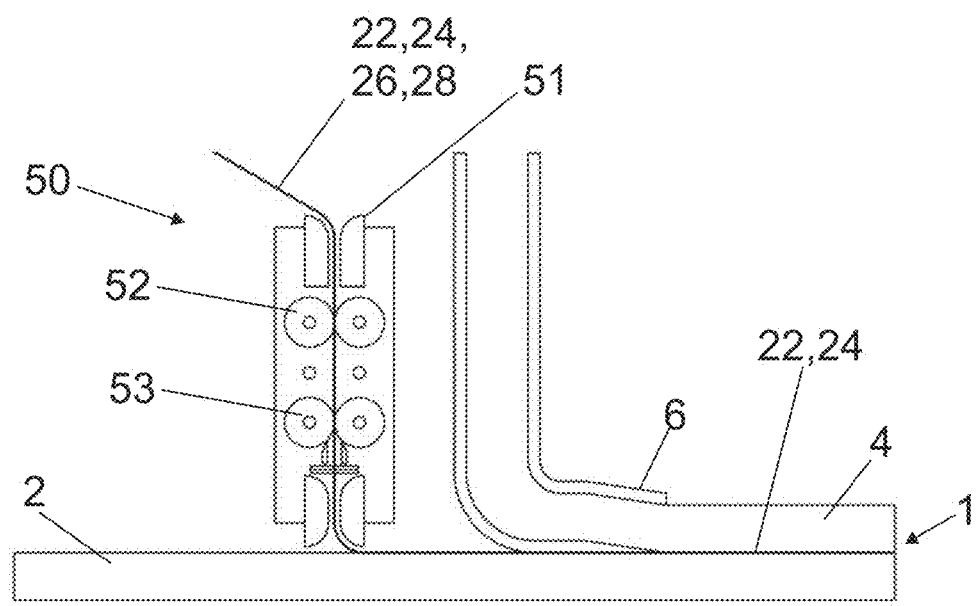
FIG. 5: is a schematic representation of an embodiment of an apparatus according to the invention for integrating a reinforcement fiber strand between concrete layers.

FIG. 5 shows a schematic representation of an embodiment of a reinforcement fiber strand delivery unit 50 according to the invention for integration of a reinforcement fiber strand 28 into an interlayer or space between two concrete strands 4 or two concrete layers 2. In this process, a first concrete strand 4 is applied first as a concrete layer 2 and the reinforcement fiber strand 28 is placed thereon as longitudinal reinforcement 22, transverse reinforcement 24 or vertical reinforcement 26. Then, another concrete strand 4 is applied via the extrusion nozzle 6, forming another concrete layer 2 immediately covering the reinforcement fiber strand 28 and thus embedding it in the concrete matrix.

In order that the application of the reinforcement fiber strand 28 can also take place independently of the working direction of the extrusion nozzle 6, which can be advantageous for covering the reinforcement, for example, the reinforcement fiber strand 28 is dispensed vertically downward from the reinforcement fiber strand delivery unit 50 via an outlet guiding device 56. Prior to this, the reinforcement fiber strand 28 passes through a first pair of drums 52, a second pair of drums 53, and a cutting device 54. The reinforcement fiber strand 28 enters the reinforcement fiber strand delivery unit 50 beforehand via an inlet device 51.

Figure 6:
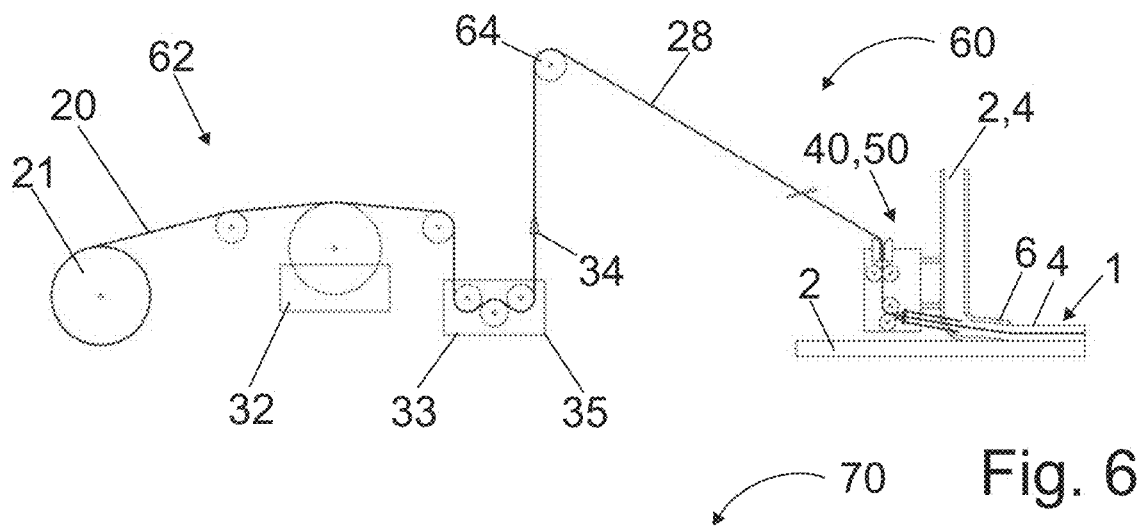
FIG. 6: is a schematic representation of an embodiment of an apparatus according to the invention for stationary-direct yarn delivery.

FIG. 6 shows a schematic representation of an embodiment of an apparatus 60 according to the invention for stationary-direct yarn delivery to the reinforcement fiber strand delivery unit 40 for direct integration into the concrete strand 4 even before it exits the extrusion nozzle 6 or to the reinforcement fiber strand delivery unit 50 for dispensing between two concrete strands 4.

Characteristic of this embodiment is that a strand preparation device 62 is provided which transfers the reinforcement fiber strand 28 to the reinforcement fiber strand delivery unit 40, 50 moving with the extrusion nozzle 6 by means of a strand transferring means 64, in the simple case configured as deflection points.

The strand preparation device 62 comprises a yarn coil 21 from which a multifilament yarn 20 is dispensed. From there, it passes through the prewetting apparatus 32, which in the preferred embodiment is configured as a kiss coater. From there, the preferably prewetted multifilament yarn reaches an impregnation device 33, which is preferably configured as a padder. The latter conveys the multifilament yarn 20 via three drums, allowing the mineral suspension 35 to penetrate between the filaments of the multifilament yarn 20 and ensure optimum impregnation. Finally, a strand nozzle 34 is used to strip off excess suspension 35 and give the reinforcement fiber strand 28 the desired cross-sectional shape. Thereafter, the reinforcement fiber strand 28 thus formed is withdrawn via the strand transferring means 64.

Figure 7:
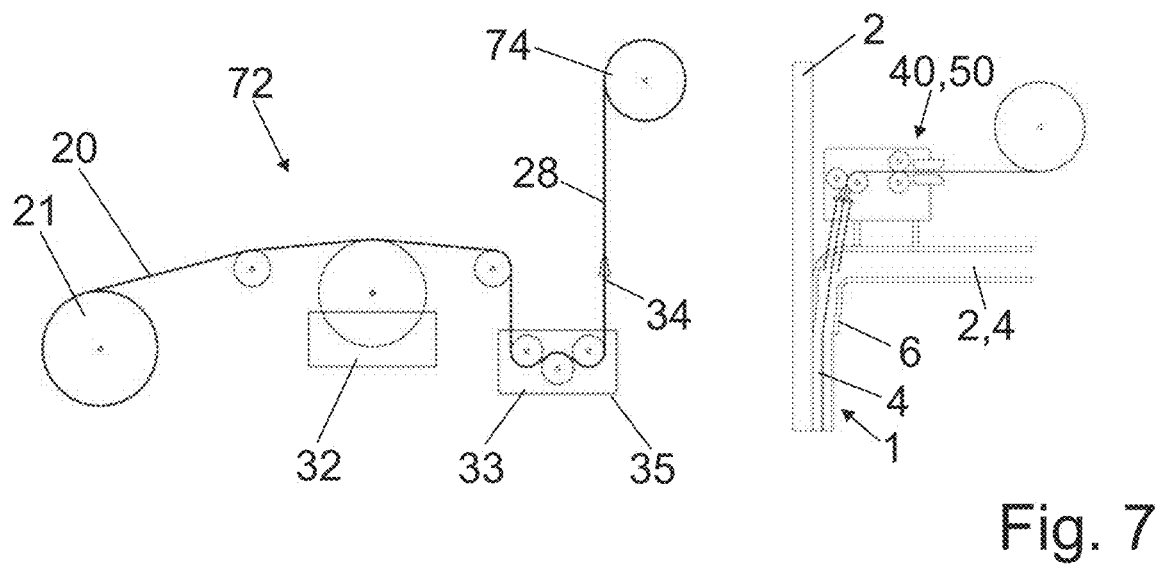
FIG. 7: is a schematic representation of an embodiment of an apparatus according to the invention for stationary-indirect yarn delivery.

FIG. 7 shows a schematic representation of an embodiment of an apparatus 70 according to the invention for stationary-indirect yarn delivery, which also comprises a strand preparation device 72, but which has a further coil, i.e. the strand coil 74, downstream of the strand nozzle 34. The freshly formed reinforcement fiber strand 28 is wound onto this coil. The strand coil 74 is immediately thereafter taken to the reinforcement fiber strand delivery unit 40, 50 so that the mineral suspension used for impregnation does not cure in an undesirable manner. There, the reinforcement fiber strand 28 is fed into the reinforcement fiber strand delivery unit 40, 50 as previously described.

Figure 8:
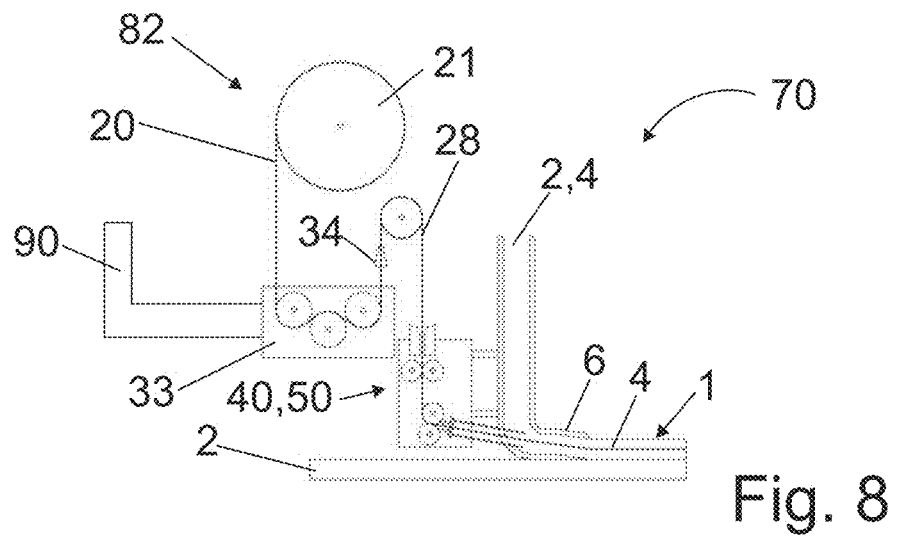
FIG. 8: is a schematic representation of an embodiment of an apparatus according to the invention for instationary-direct yarn delivery.

FIG. 8 shows a schematic representation of an embodiment of an apparatus 80 according to the invention for instationary-direct yarn delivery. In this case, the entire strand preparation device 82 is directly connected to the reinforcement fiber strand delivery unit 40, 50 and the extrusion nozzle 6 connected thereto. The entire assembly, consisting of extrusion nozzle 6, reinforcement fiber strand delivery unit 40, 50, and apparatus 80, is moved above the concrete component by a manipulation device to allow dispensing of the concrete strands 4. In this case, the strand preparation device 82 always outputs freshly produced fiber strands 28, the production of which is carried out in accordance with the manner illustrated in the description of FIGS. 6 and 7.

LIST OF REFERENCE NUMERALS

1 concrete component
2 concrete matrix material, concrete layer
4 concrete matrix material, concrete strand
6 extrusion nozzle
20 yarn, multifilament yarn
21 yarn coil
22 longitudinal reinforcement
24 transverse reinforcement
26 perpendicular reinforcement
28 reinforcement fiber strand
32 prewetting apparatus (kiss coater)
33 impregnation device (padder)
34 strand nozzle
35 mineral suspension
40 reinforcement fiber strand delivery unit (for direct integration), moving device
41 inlet device
42 first pair of drums
43 second pair of drums
44, 54 cutting device (guillotine)
46 guiding device (hose)
50 reinforcement fiber strand delivery unit (for interlayer), moving device
51 inlet device
52 first pair of drums
53 second pair of drums
56 outlet guiding device
60 apparatus for stationary-direct yarn delivery
62 strand preparation device (with strand transferring means)
64 strand transferring means
70 apparatus for stationary-indirect yarn delivery
72 strand preparation device (with strand coil)
74 strand coil
80 apparatus for instationary-direct yarn delivery
82 strand preparation device (mobile)
90 manipulation device

The invention claimed is:

1. A method for producing a reinforced concrete component (1) comprising a concrete matrix material (2, 4) and a textile reinforcement of at least one reinforcement fiber strand (28), wherein a yarn (20) is saturated with a mineral suspension (35) and is used to form the at least one reinforcement fiber strand (28), characterized in that the at least one reinforcement fiber strand (28) is dispensed from a reinforcement fiber strand delivery unit (40, 50) for dispensing the at least one reinforcement fiber strand (28) moved by a manipulation device (90), so that the at least one reinforcement fiber strand (28) is placed in at least one concrete strand (4) applied on at least one vertical side surface of a plurality of superimposed concrete layers (2), so that a perpendicular reinforcement (26) is produced which is arranged on an outer side of the reinforced concrete component (1), and wherein the at least one reinforcement fiber strand (28) is further enclosed by the concrete matrix material (2, 4) immediately upon deposition or subsequently, before the mineral suspension (35) has cured.

2. The method according to claim 1, wherein a flowable cement suspension or mortar is placed between two of the concrete layers (2) for improved adhesion between the reinforcement fiber strand (28) and the concrete layer (2).

3. The method according to claim 1, wherein a reinforcement fiber strand delivery unit (40, 50) arranged on the manipulation device (90) comprises a strand preparation device (62, 72, 82) and an impregnation device (33), wherein, according to a first alternative, the at least one reinforcement fiber strand (28) is formed stationarily in the strand preparation device (62, 72, 82) and transferred to the reinforcement fiber strand delivery unit (40, 50), wherein, according to a second alternative, the at least one reinforcement fiber strand (28) is formed stationarily in the strand preparation device (62, 72, 82), is wound up into a strand coil (74), the strand coil (74) is connected to the reinforcement fiber strand delivery unit (40, 50) in such a way that the at least one reinforcement fiber strand (28) is fed from the strand coil (74) to the reinforced concrete component (1), wherein, according to a third alternative, the reinforcement fiber strand delivery unit (40, 50) comprises a mobile strand preparation device (62, 72, 82) and the at least one reinforcement fiber strand (28) is formed in the reinforcement fiber strand delivery unit (40, 50).

4. The method according to claim 1, wherein the at least one reinforcement fiber strand (28) is formed by saturation with the mineral suspension (35) by performing an impregnation process with the impregnation device (33) as a padder; squeezing off excess suspension (35) as well as shaping of the cross-section of the reinforcement fiber strand (28) being performed with the aid of a strand nozzle (34) which is conical or funnel-shaped in a dispensing direction.

5. The method according to claim 1, wherein the concrete layers (2) form a permanent formwork and flowable concrete is filled into the permanent formwork, wherein the entire formwork is filled at once.

* * * * *